United States Patent
Ryan, Jr. et al.

(10) Patent No.: US 6,169,804 B1
(45) Date of Patent: *Jan. 2, 2001

(54) METHOD FOR VERIFYING THE EXPECTED POSTAGE SECURITY DEVICE AND ITS STATUS

(75) Inventors: Frederick W. Ryan, Jr., Oxford; Robert A. Cordery, Danbury, both of CT (US)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/754,578

(22) Filed: Nov. 21, 1996

(51) Int. Cl.[7] .................................................... H04K 1/00
(52) U.S. Cl. ........................... 380/51; 380/259; 380/277; 380/44; 705/56; 705/60; 705/61; 705/62; 705/75; 705/76; 713/200; 713/156
(58) Field of Search ............................... 380/23, 24, 25, 380/44, 49, 51, 55, 229, 259, 277; 705/401, 403, 404, 60, 61, 62, 63, 56, 75, 76; 713/200, 156

(56) References Cited

U.S. PATENT DOCUMENTS

| | | | |
|---|---|---|---|
| 5,491,750 | * | 2/1996 | Bellare et al. .......................... 380/21 |
| 5,612,889 | * | 3/1997 | Pintsov et al. ................... 364/478.14 |
| 5,742,683 | * | 4/1998 | Lee et al. .............................. 380/23 |
| 5,745,576 | * | 4/1998 | Abraham et al. ...................... 380/25 |
| 5,805,711 | * | 9/1998 | Windel et al. .......................... 380/55 |

* cited by examiner

Primary Examiner—Tod R. Swann
Assistant Examiner—Paul E. Callahan
(74) Attorney, Agent, or Firm—Kimberly S. Chotkowski; Michael E. Melton

(57) ABSTRACT

A secure and reliable method for verifying in the host system that the expected PSD is coupled to the host system includes generating a random number in the host system and encrypting the random number with a PSD state identification number. The encrypted random number is then sent to the PSD. The PSD decrypts the encrypted random number received using the PSD state identification number and sends the decrypted random number to the host system. The host system compares the decrypted random number received from the PSD to the random number generated in the host system. If they are the same, the host system has verified the expected PSD and has also verified that the PSD has not completed any transactions apart from the host system. A method for verifying that the expected host is coupled to the PSD mirrors the method for verifying the expected PSD.

14 Claims, 3 Drawing Sheets

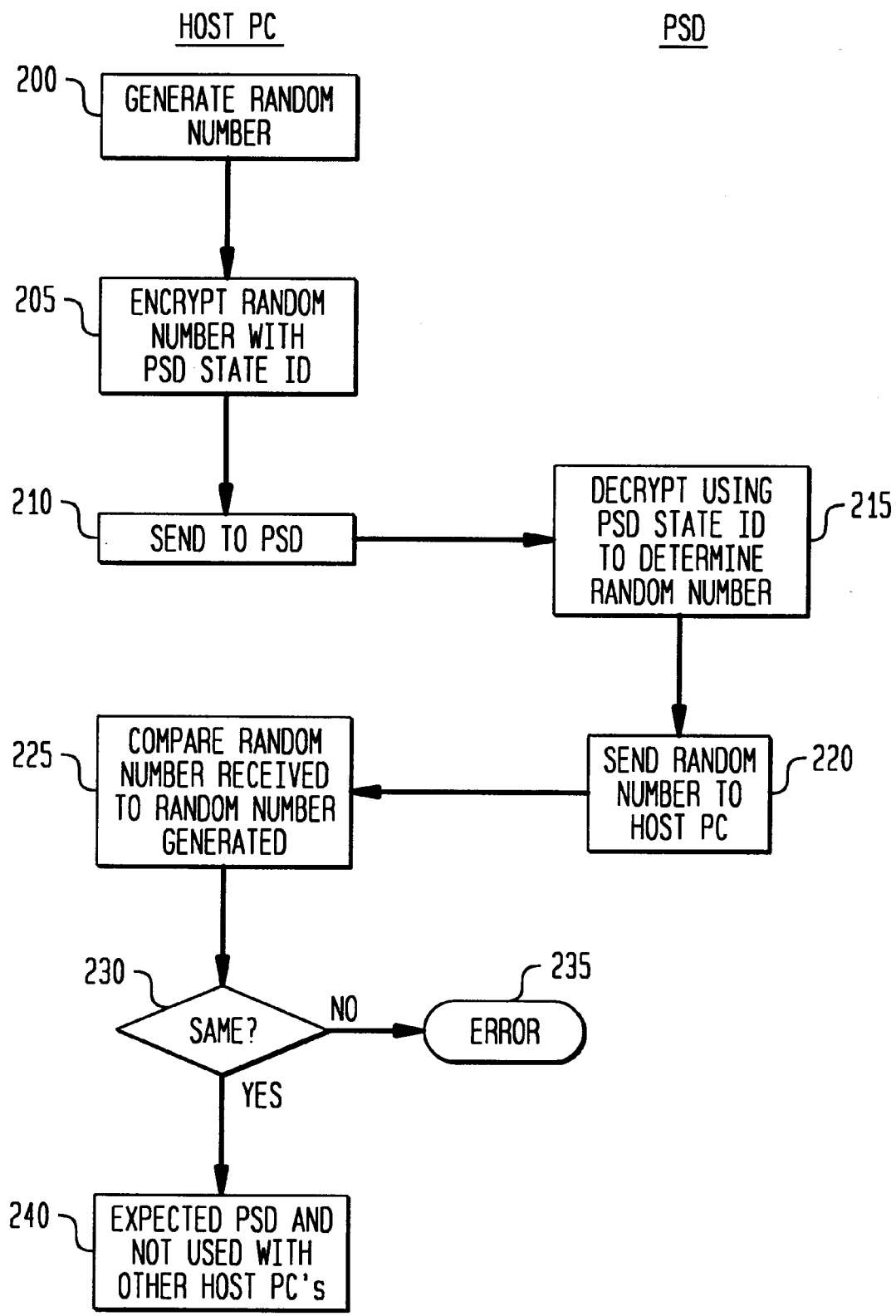

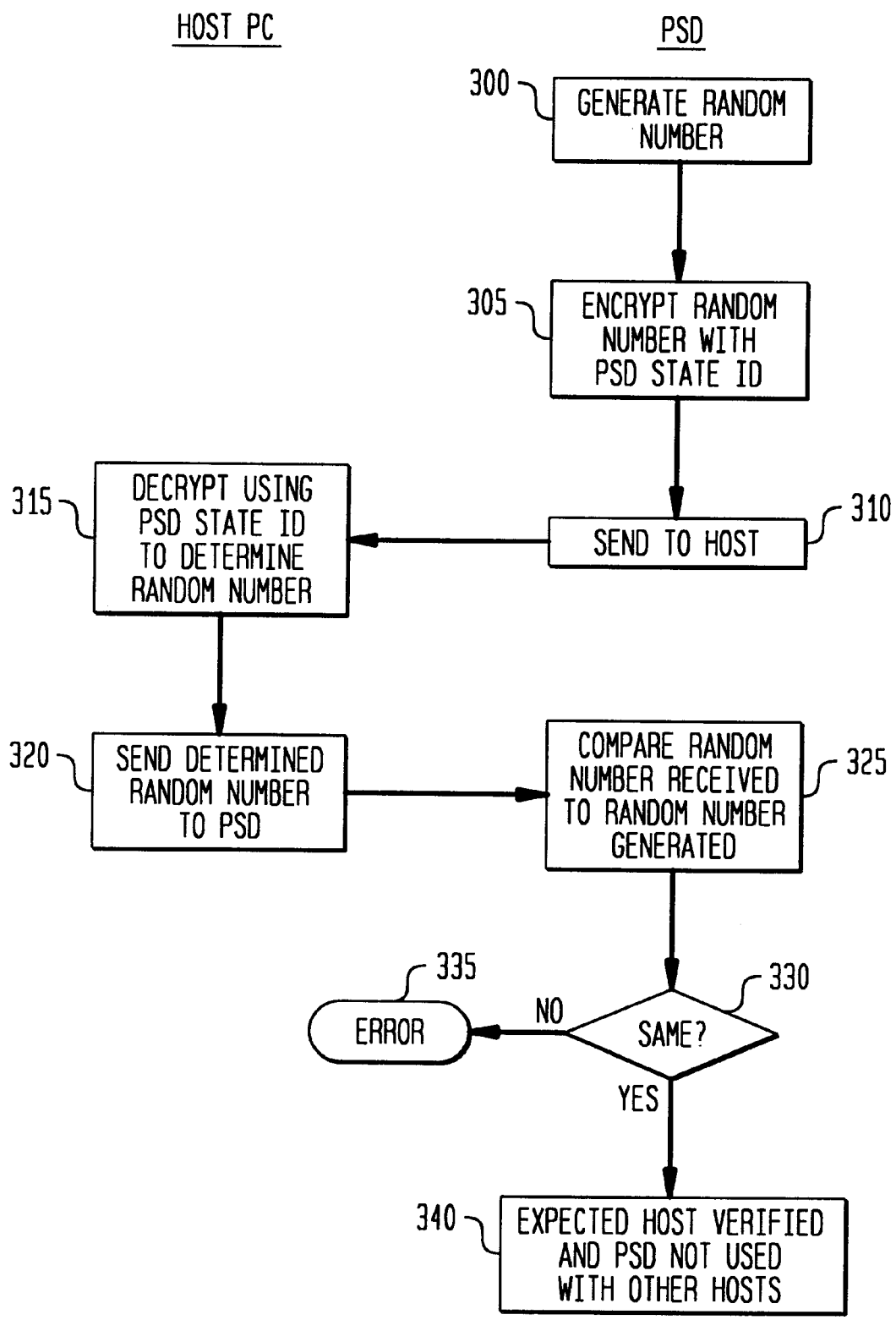

METHOD FOR VERIFYING THE EXPECTED POSTAGE SECURITY DEVICE AND ITS STATUS

RELATED APPLICATIONS

The present application is related to the following U.S. patent applications Ser. Nos. 08/754,570, 08/754,568 and 08/754,569, each filed concurrently herewith, and assigned to the assignee of the present invention.

FIELD OF THE INVENTION

The present invention relates generally to a system and method for postage metering security and, more particularly, to systems and methods for verifying authorized postage security devices.

BACKGROUND OF THE INVENTION

The Information-Based Indicia Program (IBIP) is a distributed trusted system proposed by the United States Postal Service (USPS). The IBIP is expected to support new methods of applying postage in addition to, and eventually in lieu of, the current approach, which typically relies on a postage meter to mechanically print indicia on mailpieces. The IBIP requires printing large, high density, two dimensional (2-D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

The user infrastructure, which resides at the user's site, comprises a postage security device (PSD) coupled to a host system. The PSD is a secure processor-based accounting device that dispenses and accounts for postal value stored therein. The host system may be a personal computer (PC) or a meter-based host processor. Among the various requirements set forth in the Host System Specification is that the host system verifies that the coupled PSD is "the expected PSD". Conventional postage metering devices and recent digital metering devices, such as PostPerfect and Personal Post Office, both manufactured by the assignee of the present invention, do not include such verification. Thus, a method for achieving such verification is desired.

U.S. Pat. No. 5,510,992 discloses a method whereby the host PC verifies that a storage means that is coupled to the host PC and has postal value stored therein, is authorized for use with the host PC. The method comprises the steps of storing a unique identifier, such as a serial number, in the storage means when the storage means is filled with postal value, and sending the unique identifier to the host PC when postage value is requested for dispensing. The host PC then verifies that the storage means is authorized for use with the host PC by confirming that the unique identifier retrieved from the storage device is the same as one stored in the host PC. Although such method verifies that the storage means is the expected storage device, the storage means is not a PSD because it is not a processor-based accounting device that dispenses and accounts for postal value stored therein. Furthermore, the verification of the serial number in the host PC is subject to fraud.

SUMMARY OF THE INVENTION

It has been found that the present invention provides a more secure and reliable system and method for verifying the expected PSD is coupled to the host PC. It has further been found that the present invention provides a secure and reliable system and method for verifying the expected host PC is coupled to the PSD.

The present invention provides a secure and reliable method for verifying in the host system that the expected PSD is coupled to the host system. In accordance with the present invention, a random number is generated in the host system and encrypted with a PSD state identification number. The encrypted random number is then sent to the PSD. The PSD decrypts the encrypted random number received using the PSD state identification number and sends the decrypted random number to the host system. The host system compares the decrypted random number received from the PSD to the random number generated in the host system. If they are the same, the host system has verified the expected PSD and has also verified that the PSD has not completed any transactions apart from the host system. A method for verifying that the expected host is coupled to the PSD mirrors the method for verifying the expected PSD.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 3 is a flow chart of a preferred method for verifying the expected PSD is coupled to the host system; and FIG. 4 is a flow chart of showing a method corresponding to that of FIG. 3 for verifying the expected host system.

DETAILED DESCRIPTION OF THE PRESENT INVENTION

Figure 1:
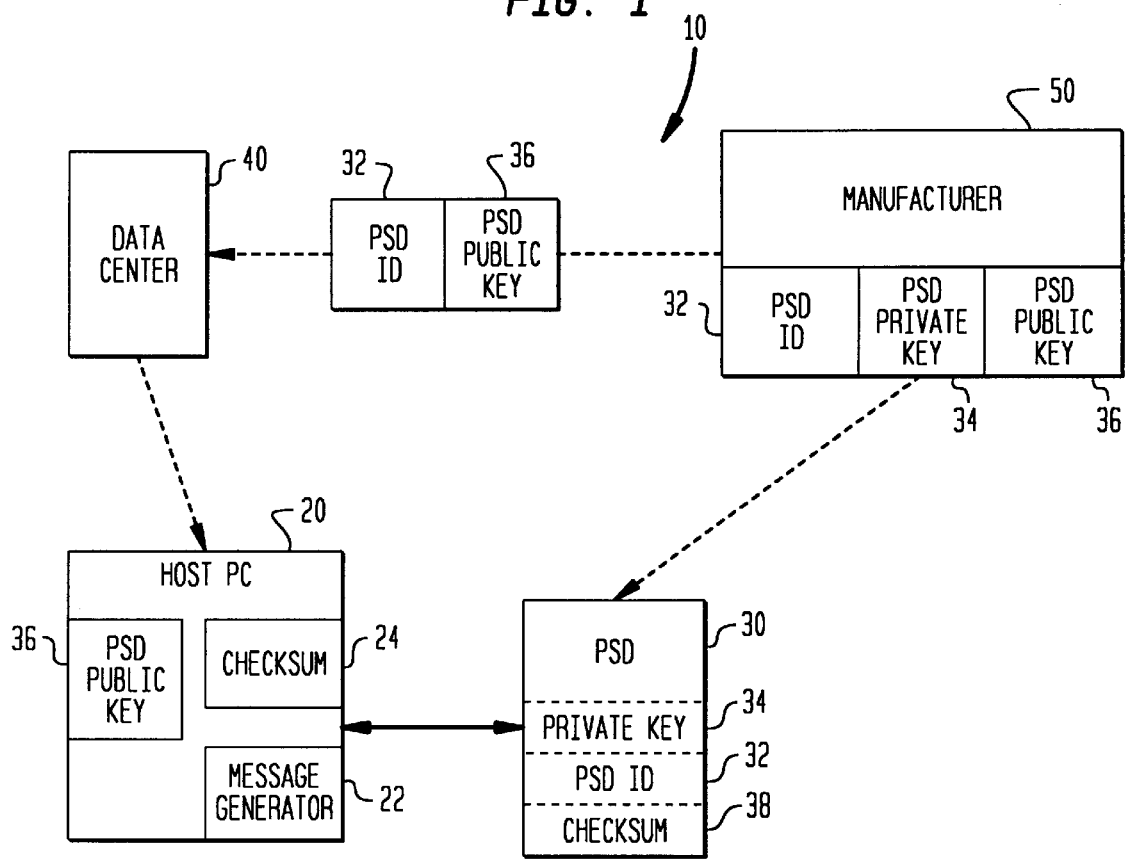
FIG. 1 is a block diagram of a postage metering system in accordance with the present invention showing a process for storing keys in a host system and a PSD coupled thereto.

In describing the present invention, reference is made to the drawings, wherein there is seen a system and methods for verifying the expected postage security device in a host system and conversely verifying the expected host system. Referring now to FIG. 1, a postage metering system, generally designated 10, includes a Host PC 20 coupled to a PSD 30, a Data Center 40 and a manufacturer 50. The manufacturer 50 initializes PSD 30 with an identification number, such as PSD ID 32, and a cryptographic key, such as PSD private key 34. The manufacturer 50 also sends the PSD ID 32 and a cryptographic key corresponding to the key in the PSD 30, such as PSD public key 36, to the Data Center 40. The Data Center 40 then sends the PSD ID 32 and the public key 36, to the Host PC 20. For the purpose of describing the present invention, the PSD private and public keys are stored in PSD 30 and Host PC 20 respectively. It will be understood that a secret key shared by the Host PC and the PSD may be used in place of such key pair.

The Host PC 20 and PSD 30 each include a microprocessor and memory (not shown). The Host PC 20 further includes a message generator 22 for generating a message. The message may be a random number or may include data indicating status of the PSD, for example a checksum 38 of PDS transaction records may be stored as checksum 24, which may be part of log files stored in Host PC 20. For the following description of the present invention checksums will be used. The PSD records stored in Host PC 20 correspond to PSD records stored in PSD 30 for each transaction by PSD 30. For a more detailed description of such storage of PSD records see U.S. Pat. No. 5,793,867 filed Dec. 19, 1995 and assigned to the assignee of the present invention, which incorporated herein by reference.

Figure 2:
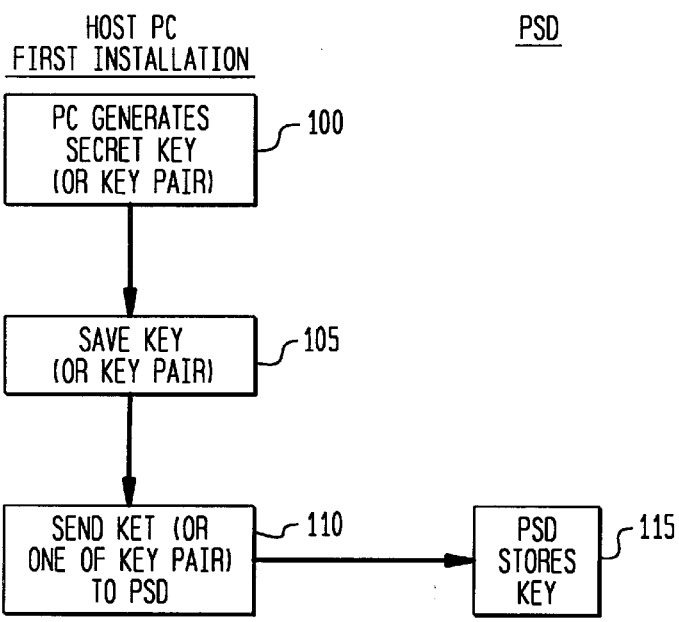
FIG. 2 is a flow chart showing an alternate process for storing keys in a host system and a PSD coupled thereto.

Referring now to FIG. 2, an alternate method for initializing the PSD with a cryptographic key is shown. At step 100, Host PC 20 generates a secret key or a key pair. The key or key pair is stored in Host PC 20, at step 105. Host PC 20 the sends the secret key or one of the keys of the key pair to PSD 30, at step 110. PSD 30 stores the key received from Host PC 20, at step 115.

Referring now to FIG. 3, a method is shown for verifying in Host PC 20 that the expected PSD is coupled thereto. At step 200, the Host PC generates a random number which is then encrypted, at step 205, with a PSD state identification number or data. In the preferred embodiment of the present invention, the PSD state identification number or data represents a predetermined status of the PSD after the previous transaction between the Host PC and the PSD. For example, the PSD state identification number or data may be a checksum of the PSD transaction logs or the last random number generated for the purpose of verifying the PSD. At step 210, the encrypted random number is sent to the PSD. At step 215, the PSD decrypts the encrypted random number received from the Host PC using the same PSD state identification number or data that was used by the Host PC. At step 220, the PSD sends the decrypted random number, (or a message derived therefrom), to the Host PC.

At step 225, the Host PC verifies that the random number received from the PSD is the same as the random number generated in the Host PC, (or that the message derived therefrom corresponds to the random number). If not the same at step 230, the Host PC flags an error and rejects the PSD from processing any further transactions, at step 235. If the random number received from the PSD is the same as the random number generated in the Host PC, at step 240, the Host PC has verified that the expected PSD is coupled to the Host PC and has not processed any transactions apart from the Host PC. Thus, the Host PC can begin requesting postal value from the PSD.

Referring now to FIG. 4, it may be required that in addition to the Host PC verifying the expected PSD, the PSD verify that the expected Host PC is coupled to the PSD. In the preferred embodiment of the present invention, such verification of the expected Host PC mirrors the process for verifying the expected PSD as set forth above.

At step 300, the PSD generates a random number which is then encrypted, at step 305, with a PSD state identification number or data. At step 310, the encrypted random number is sent to the Host PC. At step 315, the Host PC decrypts the encrypted random number received from the PSD using the same PSD state identification number or data that was used by the PSD. At step 320, the Host PC sends the decrypted random number to the PSD.

At step 325, the PSD verifies that the random number received from the Host PC is the same as the random number generated in the PSD. If not the same at step 330, the PSD flags an error which prevents the PSD from processing any further transactions, at step 335. If the random number received from the Host PC is the same as the random number generated in the PSD, at step 340, the PSD has verified that the expected Host PC is coupled to the PSD and the PSD has not processed any transactions apart from the Host PC.

It has been found that the present invention is suitable for use with any security device that is coupled to a host system in an unsecure manner. For example, the present invention could be used for a certificate metering system such as disclosed in U.S. Pat. No. 5,796,841, filed Aug. 21, 1995, assigned to the assignee of the present invention, and incorporated herein by reference.

While the present invention has been disclosed and described with reference to specific embodiments thereof, it will be apparent, as noted above, that variations and modifications may be made therein. It is, thus, intended in the following claims to cover each variation and modification, including a certificate metering system, that falls within the true spirit and scope of the present invention.

What is claimed is:

1. A method for verifying in a host system that a postage security device (PSD) is the expected PSD, and that the PSD has not completed transactions with other than the host system, the method comprising the steps of:

generating a first message in the host system;

generating in the host system first identification data using first transaction records stored in the host system, said first identification data representing a PSD status after a last transaction between the host system and any PSD, said first message including data representing at least first transaction dependent data from a first transaction record stored in the host system during the last transaction between the host system and said any PSD, said first transaction dependent data changing for each transaction between the host system and said any PSD;

encrypting the first message with first identification data;

sending the encrypted first message to the PSD;

generating in the PSD second identification data using second transaction records stored in the PSD, said second identification data representing a second status of the PSD after the last transaction between any host system and the PSD said second message including data representing at least second transaction dependent data from a second transaction record stored in the PSD during the last transaction between said any host system and the PSD, the second transaction dependent data changing for each transaction between the PSD and said any host system;

decrypting the encrypted first message with the second identification data;

sending to the host system a second message derived from the decrypted first message; and verifying in the host system that the second message corresponds to the first message.

2. The method of claim 1 wherein the first message is a random data.

3. The method of claim 1 wherein the host system is a personal computer.

4. The method of claim 1 wherein the first and second transaction dependent data include at least one of a checksum, control sum, ascending register, descending register and random data from the previous transaction.

5. The method of claim 1 wherein the second message is the decrypted first message and the step of verifying verifies that the second message is the same as the first message.

6. The method of claim 1 wherein the data respectively representing said first and second transaction dependent data is a checksum of said first and second transaction dependent data.

7. A method for verifying in a computer system that a microprocessor-based system is the expected microprocessor-based system and that the microprocessor-based system has not completed transactions with other than the computer system, the method comprising the steps of:

generating a first message in the computer system;

generating in the computer system first identification data using first transaction records stored in the computer system, said first identification data representing a status after a last transaction between the computer system and any microprocessor-based system said first message including data representing at least first transaction dependent data from a first transaction record stored in the host system during the last transaction between the host system and said any microprocessor-based system, said first transaction dependent data changing for each transaction between the host system and said any microprocessor-based system;

encrypting the first message with first identification data;

sending the encrypted first message to the a microprocessor-based system;

generating in the microprocessor-based system second identification data using second transaction records stored in the microprocessor-based system, said second identification data representing a second status of the microprocessor-based system after the last transaction between any computer system and the a microprocessor-based system said second message including data representing at least second transaction dependent data from a second transaction record stored in the microprocessor-based system during the last transaction between said any computer system and the microprocessor-based system, the second transaction dependent data changing for each transaction between the microprocessor-based system and said any computer system;

decrypting the encrypted first message with the second identification data;

sending a message derived from the decrypted message to the computer system; and verifying in the computer system that the second message corresponds to the generated message.

8. The method of claim 7 wherein the message generated is a random data.

9. The method of claim 7 wherein the data respectively representing said first and second transaction dependent data is a checksum of said first and second transaction dependent data.

10. The method of claim 7 wherein the computer system is a personal computer.

11. The method of claim 7 wherein the first and second transaction dependent data include at least one of a checksum, control sum, ascending register, descending register and random data from the previous transaction.

12. The method of claim 7 wherein the derived message is the decrypted message and the step of verifying verifies that the decrypted message is the same as the generated message.

13. A method for verifying in a host system that a postage security device (PSD) is the expected PSD, that the host system is the expected host system and that the PSD has not completed transactions with other that the host system, the method comprising the steps of:

generating a first message in the host system;

generating in the host system first identification data using first transaction records stored in the host system, said first identification data representing a PSD status after a last transaction between the host system and any PSD said first message including data representing at least first transaction dependent data from a first transaction record stored in the host system during the last transaction between the host system and said any PSD, said first transaction dependent data changing for each transaction between the host system and said any PSD;

encrypting the first message with the first identification data;

sending the encrypted first message to the PSD;

generating in the PSD second identification data using second transaction records stored in the PSD, said second identification data representing a second status of the PSD after the last transaction between any host system and the PSD said second message including data representing at least second transaction dependent data from a second transaction record stored in the PSD during the last transaction between said any host system and the PSD, the second transaction dependent data changing for each transaction between the PSD and said any host system;

decrypting the encrypted first message with the second identification data;

sending a message derived from the decrypted first message to the host system;

verifying in the host system that the message derived from the decrypted first message corresponds to the generated first message;

generating a second message in the PSD;

encrypting the second message with the second identification data;

sending the encrypted second message with the first identification data;

decrypting the encrypted second message with the first identification data;

sending a message derived from the decrypted second message to the PSD; and verifying in the PSD that the message derived from the decrypted second message corresponds to the generated second message.

14. The method of claim 13 wherein the message derived from the decrypted first message is the decrypted first message and the message derived from the decrypted second message is the decrypted second message.

* * * * *